US010397266B1

(12) United States Patent
Shintre et al.

(10) Patent No.: US 10,397,266 B1
(45) Date of Patent: *Aug. 27, 2019

(54) VERIFYING THAT THE INFLUENCE OF A USER DATA POINT HAS BEEN REMOVED FROM A MACHINE LEARNING CLASSIFIER

(71) Applicant: SYMANTEC CORPORATION, Mountain View, CA (US)

(72) Inventors: Saurabh Shintre, Sunnyvale, CA (US); Jasjeet Dhaliwal, Morgan Hill, CA (US)

(73) Assignee: SYMANTEC CORPORATION, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/250,199

(22) Filed: Jan. 17, 2019

Related U.S. Application Data

(63) Continuation of application No. 16/004,267, filed on Jun. 8, 2018, now Pat. No. 10,225,277.
(Continued)

(51) Int. Cl.
*H04L 29/06* (2006.01)
*G06N 20/00* (2019.01)
(Continued)

(52) U.S. Cl.
CPC ........ *H04L 63/1433* (2013.01); *G06F 21/577* (2013.01); *G06F 21/6245* (2013.01);
(Continued)

(58) Field of Classification Search
CPC .............. G06F 21/6245; G06F 21/577; G06F 21/6254; H04L 63/1433
See application file for complete search history.

(56) References Cited

U.S. PATENT DOCUMENTS 8,504,532 B2  8/2013 Saxena et al.
8,744,987 B1  6/2014 Forman et al.
(Continued)

OTHER PUBLICATIONS

L. Xu, C. Jiang, J. Wang, J. Yuan and Y. Ren, "Information Security in Big Data: Privacy and Data Mining," in IEEE Access, vol. 2, pp. 1149-1176, 2014. (Year: 2014).*
(Continued)

*Primary Examiner* — Karl L Schmidt
(74) *Attorney, Agent, or Firm* — Maschoff Brennan

(57) ABSTRACT

Verifying that influence of a user data point has been removed from a machine learning classifier. In some embodiments, a method may include training a machine learning classifier using a training set of data points that includes a user data point, calculating a first loss of the machine learning classifier, updating the machine learning classifier by updating parameters of the machine learning classifier to remove influence of the user data point, calculating a second loss of the machine learning classifier, calculating an expected difference in loss of the machine learning classifier, and verifying that the influence of the user data point has been removed from the machine learning classifier by determining that the difference between the first loss and the second loss is within a threshold of the expected difference in loss.

20 Claims, 3 Drawing Sheets

Related U.S. Application Data

(60) Provisional application No. 62/676,201, filed on May 24, 2018.

(51) Int. Cl.
*G06F 21/62* (2013.01)
*G06F 21/57* (2013.01)

(52) U.S. Cl.
CPC ......... *G06F 21/6254* (2013.01); *G06N 20/00* (2019.01); *G06F 2221/033* (2013.01)

(56) References Cited

U.S. PATENT DOCUMENTS

| | | | |
|---|---|---|---|
| 9,251,177 B2 | 2/2016 | Ennis et al. | |
| 9,824,332 B1 | 11/2017 | Everton et al. | |
| 9,870,465 B1 | 1/2018 | Levi et al. | |
| 9,967,188 B2 | 5/2018 | Kanonakis et al. | |
| 10,049,302 B1 | 8/2018 | Liu et al. | |
| 2011/0087625 A1 | 4/2011 | Tanner, Jr. et al. | |
| 2011/0093258 A1 | 4/2011 | Xu et al. | |
| 2016/0127319 A1 | 5/2016 | Xiong et al. | |
| 2016/0203221 A1 | 7/2016 | Rao et al. | |
| 2017/0243028 A1 | 8/2017 | LaFever et al. | |
| 2017/0344754 A1 | 11/2017 | Kumar et al. | |
| 2018/0173892 A1 | 6/2018 | Zibuschka et al. | |
| 2018/0197111 A1 | 7/2018 | Crabtree et al. | |
| 2018/0276507 A1 | 9/2018 | Marchezi et al. | |
| 2019/0050592 A1* | 2/2019 | Grau | G06F 21/6245 |
| 2019/0050683 A1* | 2/2019 | Gupta Hyde | G06K 9/6257 |
| 2019/0102277 A1* | 4/2019 | Walenstein | G06F 11/362 |
| 2019/0122135 A1* | 4/2019 | Parker | G06N 7/00 |
| 2019/0130132 A1* | 5/2019 | Barbas | G06F 21/6254 |
| 2019/0156056 A1* | 5/2019 | Chavez | G06F 21/6245 |
| 2019/0171846 A1* | 6/2019 | Conikee | G06F 21/6245 |
| 2019/0188327 A1* | 6/2019 | Bastide | G06F 16/9535 |

OTHER PUBLICATIONS

Wang, Gang, et al. "Whispers in the dark: analysis of an anonymous social network." Proceedings of the 2014 Conference on Internet Measurement Conference. ACM, pp. 137-150. 2014. (Year: 2014).*

Fredrickson et al.; "Model Inversion Attacks that Exploit Confidence Information and Basic Countermeasures" In CCS'15; Oct. 12-16, 2015; Denver, Colorado; 12 pages.

Koh et al.; "Understanding Black-box Predictions via Influence Functions"; presented at Proceedings of the 34th International Conference on Machine Learning; Sydney, Australia; 2017; 11 pages.

Shokri et al.; "Membership Inference Attacks Against Machine Learning Models"; 2017 IEEE Symposium on Securit and Privacy (SP); San Jose, CA; 2017; pp. 3-18.

Hitaj et al.; "Deep Models Under the GAN: Information Leakage from Collaborative Deep Learning"; Proceeding of the 2017 ACM SIGSAC Conference and Communications Security; ACM; 2017; pp. 603-618.

* cited by examiner

US 10,397,266 B1

VERIFYING THAT THE INFLUENCE OF A USER DATA POINT HAS BEEN REMOVED FROM A MACHINE LEARNING CLASSIFIER

CROSS-REFERENCE TO A RELATED APPLICATION

This application is a continuation of U.S. application Ser. No. 16/004,267, filed Jun. 8, 2018, which claims the benefit of, and priority to, U.S. Provisional Application No. 62/676,201, filed May 24, 2018, each of which is incorporated herein by reference in its entirety.

BACKGROUND

Machine learning techniques have been successfully employed in security applications that protect network devices, such as spam filtering, intrusion detection, malware identification and detection, and biometric recognition. Accordingly, machine learning has become a fundamental tool for computer security due to its efficiency, effectiveness, and reliability in dealing with changing and complex datasets.

Unfortunately, however, conventional machine learning techniques are generally designed for a non-adversarial environment. For example, conventional machine learning techniques generally assume that the data employed in training a machine learning classifier will not be subject to abuse at the runtime when the machine learning classifier is accessed. However, with a growing number of security applications built upon this assumption, machine learning classifiers themselves are increasingly targets of attacks from malicious adversaries seeking to access the data employed in training the machine learning classifiers. Because the data employed in training machine learning classifiers is often sensitive data (such as user-specific personal data), these attacks from malicious adversaries on the machine learning classifiers can leave the machine learning classifiers vulnerable.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for verifying that influence of a user data point has been removed from a machine learning classifier may be performed, at least in part, by a network device including one or more processors. The method may include training, by a network device, a machine learning classifier using a training set of data points that includes a user data point. The method may further include calculating, by the network device, a first loss of the machine learning classifier. The method may also include updating, by the network device, the machine learning classifier by updating parameters of the machine learning classifier to remove influence of the user data point using an influence function without retraining the machine learning classifier. The method may further include calculating, by the network device, a second loss of the machine learning classifier. The method may also include calculating, by the network device using an influence function, an expected difference in loss of the machine learning classifier due to removal of the influence of the user data point from the machine learning classifier. The method may further include verifying that the influence of the user data point has been removed from the machine learning classifier by determining, by the network device, that the difference between the first loss and the second loss is within a threshold of the expected difference in loss.

In some embodiments, the machine learning classifier may be one or more of a Logistic Regression (LR) classifier, a Linear Support Vector Machine (LSVM) classifier, and a Multi-Layer Perceptron (MLP) classifier.

In some embodiments, the user data point may include personally identifiable information of an individual inside the European Union. In these embodiments, the method may further include receiving, at the network device, a request pursuant to the European Union General Data Protection Regulation (GDPR) to remove the influence of the user data point from the machine learning classifier.

In some embodiments, the method may further include receiving, at the network device from a second network device, application programming interface (API) queries of a model inversion attack against the machine learning classifier, and thwarting, at the network device, the model inversion attack against the machine learning classifier, due to the updated parameters of the machine learning classifier, to protect the user data point from being exposed by the model inversion attack. In these embodiments, the machine learning classifier may be exposed to the API as a Machine Learning as a Service (MLaaS) offering to enable API queries against the machine learning classifier.

In some embodiments, the method may further include sending, from the network device and to a second network device, verification that the influence of the user data point has been removed from the machine learning classifier.

Also, in some embodiments, one or more non-transitory computer-readable media may include one or more computer-readable instructions that, when executed by one or more computing devices, cause the one or more computing devices to perform a method for verifying that influence of a user data point has been removed from a machine learning classifier.

Further, in some embodiments, a network device may include one or more processors and one or more non-transitory computer-readable media that include one or more computer-readable instructions that, when executed by the one or more processors, cause the network device to perform a method for verifying that influence of a user data point has been removed from a machine learning classifier.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
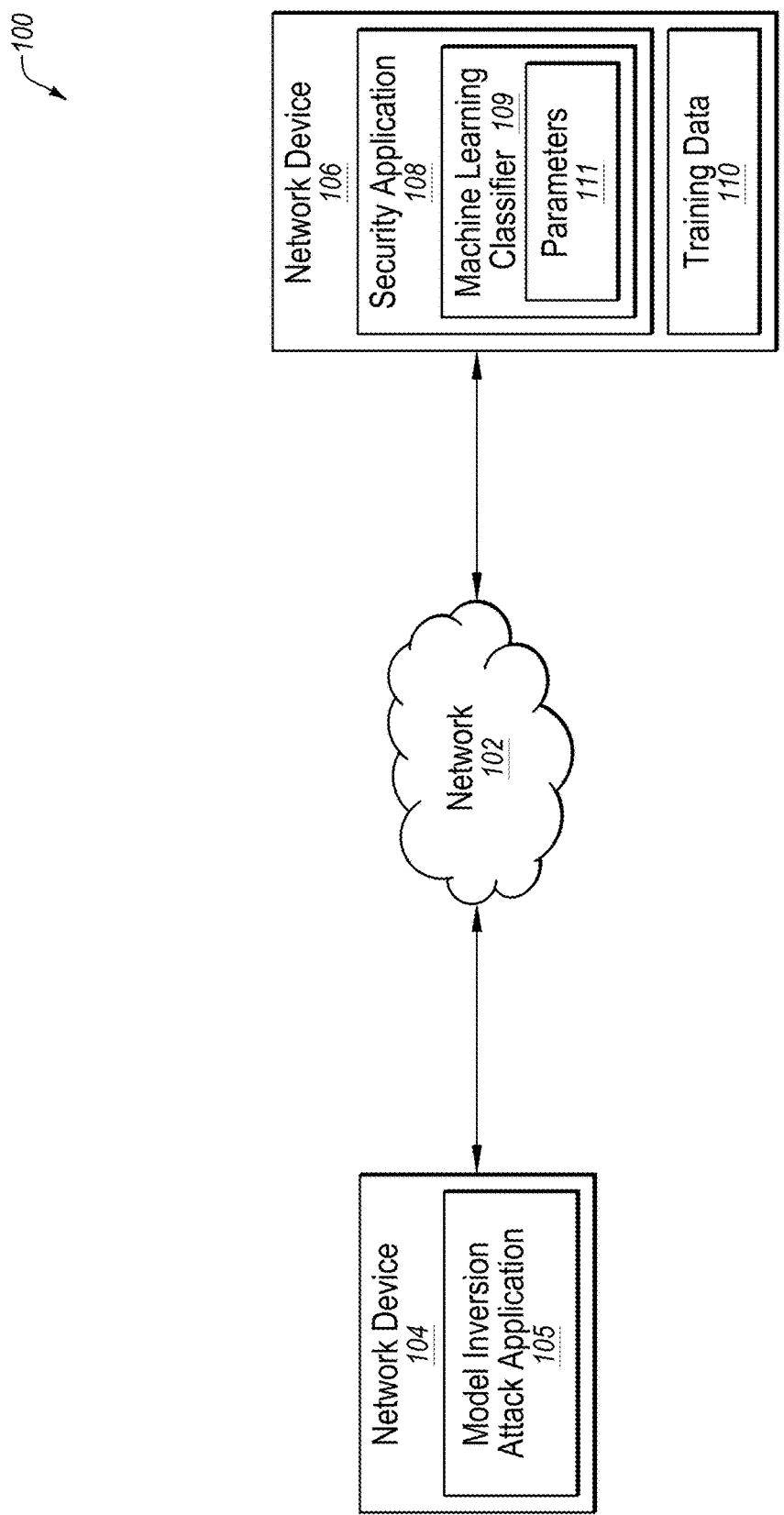
FIG. 1 illustrates an example system configured for verifying that influence of a user data point has been removed from a machine learning classifier.

Conventional machine learning techniques are generally designed for a non-adversarial environment, and generally assume that sensitive data employed in training a machine learning classifier will not be subject to abuse at the runtime when the machine learning classifier is accessed. However, with a growing number of security applications that employ machine learning classifiers built upon this assumption, machine learning classifiers themselves are increasingly targets of attacks from malicious adversaries seeking to access the sensitive training data, which can leave the network devices upon which the machine learning classifiers are executing vulnerable.

One particular category of attack against a machine learning classifier is known as an explorative attack. An explorative attack generally involves a malicious application probing a machine learning classifier, such as via a publicly accessible application programming interface (API) of the machine learning classifier, to uncover or extract sensitive training data that was used to train the machine learning classifier. One such explorative attack is a model inversion attack, which may be employed to reversely unveil privacy-sensitive attributes of training data. Additional details regarding model inversion attacks may be understood by one of skill in the art in light of Fredrikson, Matt, Somesh Jha, and Thomas Ristenpart, "Model inversion attacks that exploit confidence information and basic countermeasures," Proceedings of the 22nd ACM SIGSAC Conference on Computer and Communications Security, A C M, 2015, which is incorporated herein by reference in its entirety.

Model inversion attacks are particularly problematic in light of the European Union General Data Protection Regulation (GDPR) which comes into effect for individuals inside the European Union on May 25, 2018. The GDPR includes a "right to be forgotten," where a user can request that a company delete all their previously stored user data, and the company must comply upon receipt of the request. In order to prove compliance with the GDPR, companies might be asked to provide a "proof" that such a request for deletion of user data was indeed completed, during an audit for example. While raw training data can be easily deleted and the deletion thereof can be easily proven during an audit, it may be extremely difficult to delete user data that a user requested to be deleted, or at least the influence of user data, where a machine learning classifier is trained with training data that includes the user data, and which user data may be revealed through a model inversion attack.

One potential solution to this problem is to delete a machine learning classifier and retrain a new machine learning classifier in its place with training data after the user data was deleted from the original training data. However, since a machine learning classifier may be trained with user data from many users (e.g., billions of users), deleting the machine learning classifier and retraining a new machine learning classifier each time that a user requests for his/her user data to be deleted can be cost and time prohibitive. Further, it may be difficult to prove that the retrained machine learning classifier no longer uses user data that a user requested be deleted.

The embodiments disclosed herein may provide various benefits. In particular, the embodiments disclosed herein may, for example, enable verifying that influence of a user data point has been removed from a machine learning classifier. For example, where a machine learning classifier has been trained using a training set of data points that includes a user data point, and the user later requests that the user data point be deleted (pursuant to the GDPR "right to be forgotten," for example), some embodiments disclosed herein may calculate a first loss of the machine learning classifier, update the machine learning classifier by updating parameters of the machine learning classifier to remove influence of the user data point using an influence function, calculate a second loss of the machine learning classifier, and calculate, using an influence function, an expected difference in loss of the machine learning classifier due to removal of the influence of the user data point from the machine learning classifier. Then, if the difference between the first loss and the second loss is within a threshold of the expected difference in loss, some embodiments disclosed herein may verify that the influence of the user data point has been removed from the machine learning classifier.

Thus, some embodiments disclosed herein may remove the influence of a user data point from a machine learning classifier, and verify the removal of the influence of the user data, thus complying with a GDPR "right to be forgotten" request, without cost and time prohibitive retraining of the machine learning classifier. Further, once the influence of the user data point has been removed from a machine learning classifier using the embodiments disclosed herein, even where the machine learning classifier is deployed in an adversarial environment, the user data point cannot be obtained through a model inversion attack, thus causing the user data point to remain protected and secure at runtime even when the machine learning classifier is subject to a model inversion attack.

Turning to the figures, FIG. 1 illustrates an example system 100 configured for verifying that influence of a user data point has been removed from a machine learning classifier. The system 100 may include a network 102, a network device 104, and a network device 106.

In some embodiments, the network 102 may be configured to communicatively couple the network device 104 to the network device 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
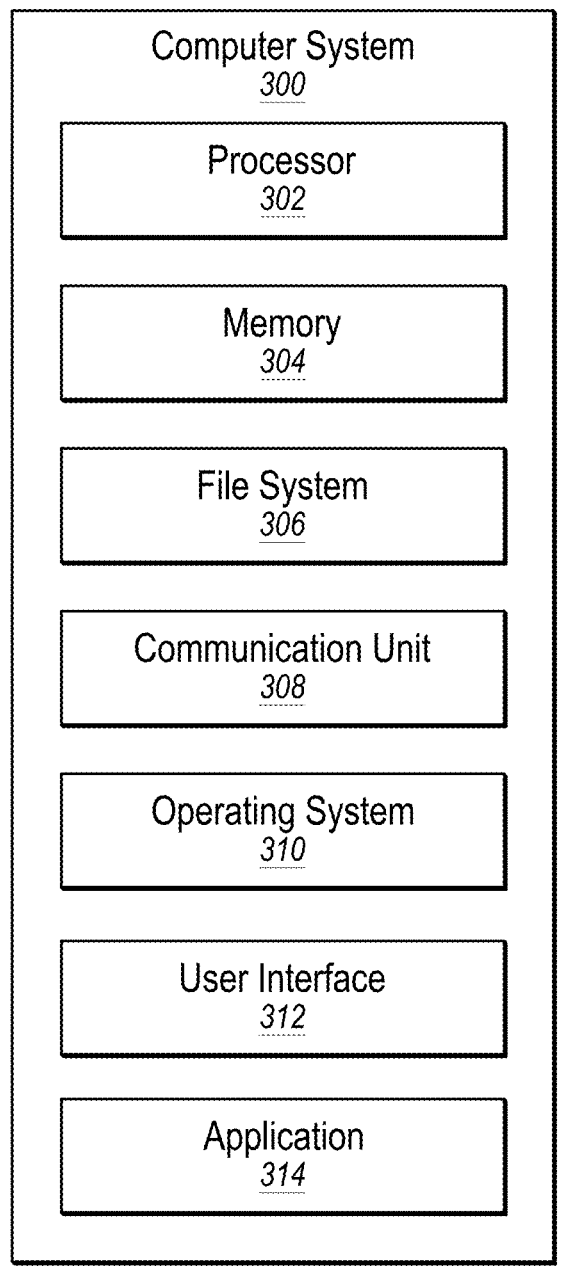
FIG. 3 illustrates an example computer system that may be employed in verifying that influence of a user data point has been removed from a machine learning classifier.

In some embodiments, the network device 104 may be any computer system capable of communicating over the network 102, examples of which are disclosed herein in connection with the computer system 300 of FIG. 3. The network device 104 may include one or more malicious applications, such as the model inversion attack application 105. In some embodiments, the model inversion attack application 105 may include functionality of one or more of a spyware, a virus, a worm, a logic bomb, a trapdoor, a Trojan horse, a Remote Admin Trojan (RAT), a malware, a mobile malicious code, a malicious font, and a rootkit. When the model inversion attack application 105 is stored or executed on the network device 104, the network device 104 may be considered to be an "infected" network device.

In some embodiments, the network device 106 may be any computer system capable of communicating over the network 102 and capable of monitoring the network device 104 for infections with malicious applications (in real-time and/or after-the-fact by analyzing data), examples of which are disclosed herein in connection with the computer system 300 of FIG. 3. In some embodiments, the network device 106 may include a security application 108 that may be configured to execute and ultimately protect a machine learning classifier 109. In some embodiments, the network device 106 may also store, or have access to, training data 110. The training data 110 may be used to train the machine learning classifier 109 and may include user data points. When a particular user requests that a particular user data point in the training data 110 be deleted, such as through a GDPR "right to be forgotten" request, the security application 108 may delete the user data point from the training data 110, and the security application 108 may remove the influence of the user data point from the machine learning classifier 109, without the security application 108 retraining the machine learning classifier 109, using the example method 200 of FIG. 2 disclosed herein.

In some embodiments, the security application 108 may include, or be part of, a User Behavior Analytics (UBA) application and/or a Security Information and Event Management (SIEM) application. In some embodiments, the machine learning classifier 109 may include one or more of a Support Vector Machine classifier, an Artificial Neural Network classifier, and a Deep Learning Network classifier, a Best-First Decision Tree classifier, a C4.5 Tree classifier, a Repeated Incremental Pruning to Produce Error Reduction (RIPPER) classifier, a Fuzzy Unordered Rule Induction Algorithm (FURIA) classifier, a Logistic Regression (LR) classifier, a Linear Support Vector Machine (LSVM) classifier, and a Multi-Layer Perceptron (MLP) classifier.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
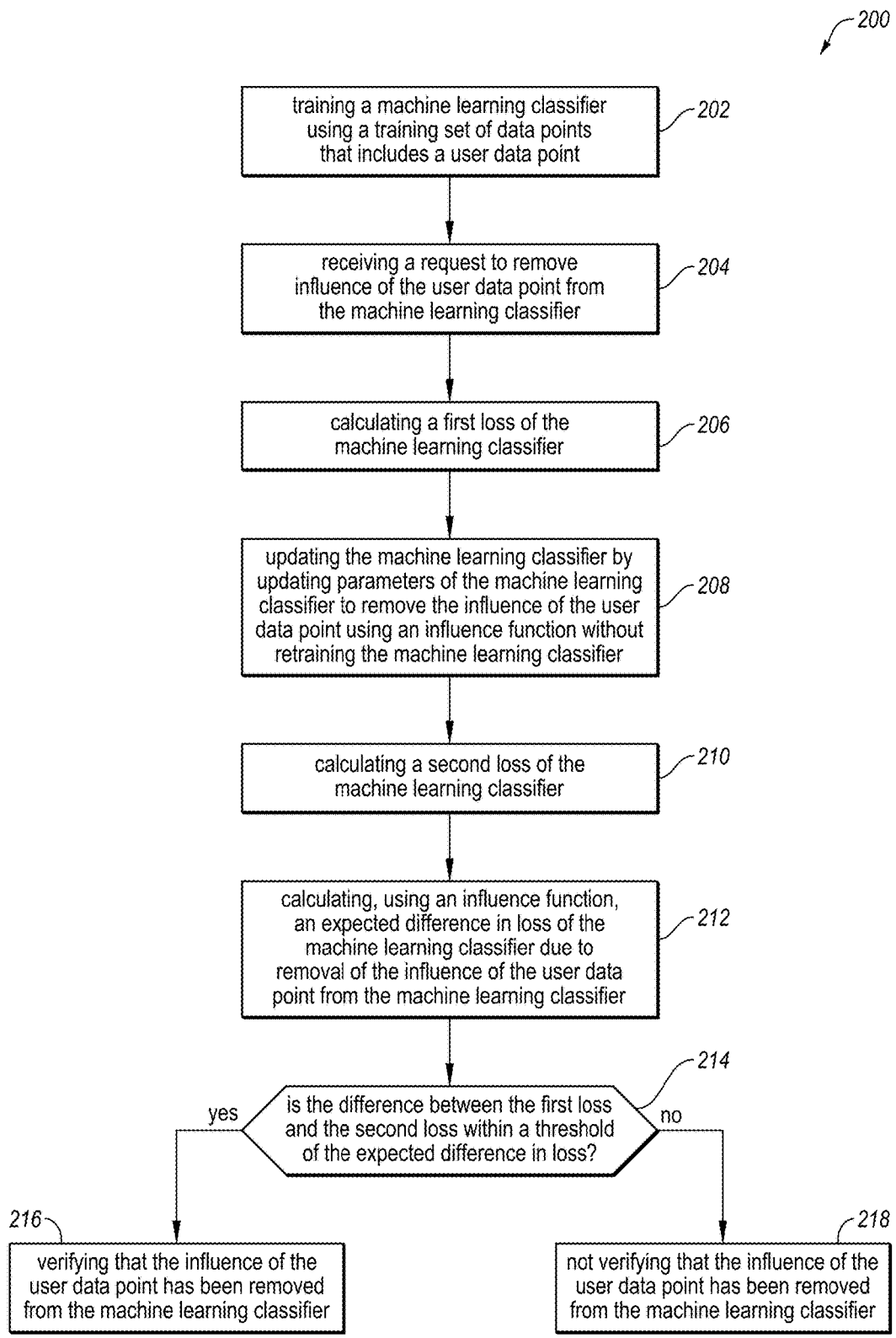
FIG. 2 is a flowchart of an example method for verifying that influence of a user data point has been removed from a machine learning classifier.

FIG. 2 is a flowchart of an example method 200 for verifying that influence of a user data point has been removed from a machine learning classifier. The method 200 may be performed, in some embodiments, by a device or application, such as by the security application 108 executing on the network device 106 of FIG. 1. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at action 202, training a machine learning classifier using a training set of data points that includes a user data point. For example, the security application 108 may train, at action 202, the machine learning classifier 109 using the training data 110. The training data 110 may be a training set of data points that includes a user data point.

The method 200 may include, at action 204, receiving a request to remove influence of the user data point from the machine learning classifier. For example, the security application 108 may receive, at action 204, a request to remove influence of the user data point from the machine learning classifier 109. This request may be a GDPR "right to be forgotten" request, for example.

The method 200 may include, at action 206, calculating a first loss of the machine learning classifier. For example, the security application 108 may calculate, at action 206, a first loss of the machine learning classifier 109, prior to the updating of the machine learning classifier at action 208.

The method 200 may include, at action 208, updating the machine learning classifier by updating parameters of the machine learning classifier to remove influence of the user data point using an influence function, without retraining the machine learning classifier. For example, the security application 108 may update, at action 208, the machine learning classifier 109 by updating parameters of the machine learning classifier 109 to remove the influence of the user data point using an influence function, without retraining the machine learning classifier 109.

The method 200 may include, at action 210, calculating a second loss of the machine learning classifier. For example, the security application 108 may calculate, at action 210, a second loss of the machine learning classifier 109, subsequent to the updating of the machine learning classifier at action 208.

The method 200 may include, at action 212, calculating, using an influence function, an expected difference in loss of the machine learning classifier due to removal of the influence of the user data point from the machine learning classifier. For example, the security application 108 may calculate, at action 212, using an influence function, an expected difference in loss of the machine learning classifier 109 due to removal of the influence of the user data point from the machine learning classifier 109.

The method 200 may include, at action 214, determining whether the difference between the first loss and the second loss is within a threshold of the expected difference in loss. If so (yes at action 214), the method 200 may include, at action 216, verifying that the influence of the user data point has been removed from the machine learning classifier. If not (not at action 214), the method 200 may include, at action 218, not verifying that the influence of the user data point has been removed from the machine learning classifier. For example, the security application 108 may determine, at action 214, that the difference between the first loss and the second loss is within a threshold of the expected difference in loss, and then verify, at action 216, that the influence of the user data point has been removed from the machine learning classifier 109.

In some embodiments, the method 200 may result in the security application 108 verifying that the influence of a user data point has been removed from the machine learning classifier 109. Further, some embodiments of the method 200 may accomplish the removal of the influence of a user data point from the machine learning classifier 109, and the verification of the removal of the influence of the user data point, thus complying with a GDPR "right to be forgotten" request, without cost and time prohibitive retraining of the machine learning classifier 109. Further, once the influence of the user data point has been removed from the machine learning classifier 109 using the embodiments disclosed herein, even where the machine learning classifier 109 is deployed in an adversarial environment, the user data point cannot be obtained through a model inversion attack from the model inversion attack application 105 using API queries against the machine learning classifier 109, thus causing the user data point to remain protected and secure at runtime even when the machine learning classifier 109 is subject to a model inversion attack from the model inversion attack application 105.

In some embodiments, the method 200 may enable using influence measurements to effectively remove a user's data from the training of the machine learning classifier 109 without re-training the machine learning classifier 109 afresh. Further, in some embodiments, the method 200 may enable using influence measurements to provide a proof that a certain user's data no longer has any influence in the training of the machine learning classifier 109.

Further, in some embodiments, the method 200 may enable a company to comply with a GDPR "right to be forgotten" request by (1) receiving a demand from a user for removal of the user's data from the training set and its influence from their models, (2) measuring the change in model parameters (as described in Koh and Liang 2017) with regard to the upweighting of the user's data and changing the parameters of the model in the direction opposite to this change, in order to remove the influence of the user's data from the model (which under certain constraints is equivalent to removing the user's data and retraining the model), (3) maintaining a validation data and computing an expected difference in loss of the model over all validation points using an influence function, which attestation acts like a mathematical proof of having or not having the user's data in the training set. Then an auditor may compute the actual difference in loss in the model over the validation points and ensure that the model no longer relies on the user's data, and if the actual difference in loss is not within a threshold, the auditor can force the company to retrain the model without the user's data.

Although the actions of the method 200 are illustrated in FIG. 2 as discrete actions, various actions may be divided into additional actions, combined into fewer actions, reordered, expanded, or eliminated, depending on the desired implementation. For example, in some embodiments, actions 202-216 may be performed without performing action 218. Also, in some embodiments, action 202 may be eliminated or may be performed by an entity that is different from the entity performing the other actions of the method 200. Similarly, in some embodiments, the actions of the method 200 involved in the verification may be performed by a different entity than the actions of training or updating of the machine learning classifier. In these embodiments, the machine learning classifier may be securely transferred to this other entity (such as an auditing entity) so that the entity can perform the verification.

Also, in some embodiments, the method 200 may further include receiving, at the network device from a second network device, API queries of a model inversion attack against the machine learning classifier, and thwarting, at the network device, the model inversion attack against the machine learning classifier, due to the updated parameters of the machine learning classifier, to protect the user data point from being exposed by the model inversion attack. In these embodiments, the machine learning classifier may be exposed to the API as a Machine Learning as a Service (MLaaS) offering to enable API queries against the machine learning classifier. Further, in some embodiments, the method 200 may further include sending, from the network device to a second network device, verification that the influence of the user data point has been removed from the machine learning classifier.

Further, it is understood that the method 200 may improve the functioning of a network device itself, and improve the technical field of machine learning. For example, the functioning of the network device 106 of FIG. 1 may itself be improved by the method 200. For example, the network device 106 may be improved by the verifying that the influence of a user data point has been removed from the machine learning classifier 109, without cost and time prohibitive retraining of the machine learning classifier 109. Further, once the influence of the user data point has been removed from a machine learning classifier 109 using the embodiments disclosed herein, the user data point may remain protected and secure at runtime even when the machine learning classifier 109 is subject to a model inversion attack.

In some embodiments, the machine learning classifier 109 may be defined as a model, and the updating and verifying of the machine learning classifier 109 during the method 200 may be defined, as follows:

Model Risk:

$$R = \frac{1}{n}\sum_{i=1}^{n} L(x_i, y_i)$$

Model Parameters:

$$\hat{\vartheta} = \operatorname*{argmin}_{\vartheta}(R)$$

Model Hessian:

$$\nabla_\vartheta^2 R = \frac{1}{n}\sum_{i=1}^{n} \nabla_\vartheta^2 L(x_i, y_i)$$

Model Parameters after up-weighting training point z from training data:

$$\hat{\vartheta}_{\varepsilon,z} = \operatorname*{argmin}_{\vartheta}(R + \varepsilon L(z, y_z))$$

where, $$\varepsilon = \frac{1}{n}$$

Change in parameters by up-weighting z:

$$\frac{\partial \hat{\vartheta}_{\varepsilon,z}}{\partial \varepsilon} = -(\nabla_\vartheta^2 R)^{-1} \nabla_\vartheta L(z, y_z)$$

Influence of up-weighting training point z on the model loss:

$$\frac{\partial L(x, y_x)}{\partial \varepsilon} = -\nabla_\vartheta L(x, y_x)(\nabla_\vartheta^2 R)^{-1} \nabla_\vartheta L(z, y_z)$$

In some embodiments, the updating of the machine learning classifier to remove the influence of the user data point z during the action 208 of the method 200 may include updating the parameters of the machine learning classifier 109 by:

$$\hat{\vartheta}\_\text{new} = \hat{\vartheta} - \frac{\partial \hat{\vartheta}_{\varepsilon,z}}{\partial \varepsilon}$$

In some embodiments, the verification that the influence of the user data point z has been removed from the machine learning classifier 109 during the method 200 may include:

maintaining a validation set: $(v_i, y_{v_i}) i \in [1,n]$ calculating model loss on the validation set before and after the parameter change for each validation point, verify that change in model loss for the validation point is within a threshold of the influence of user data point z on model loss, where we:

Let model loss before parameter change=$L^{\hat{\theta}}(v_i, y_{v_i})$

Let model loss after parameter change=$L^{\hat{\theta}\_new}(v_i, y_{v_i})$

Verify the below holds for k validation points:

$$L^{\hat{\theta}}(v_i, y_{v_i}) - L^{\hat{\theta}\_new}(v_i, y_{v_i}) \approx -\nabla L(v_i, y_{v_i})(\nabla_\theta^2 R)^{-1} \nabla_\theta L(z, y_z)$$

where, k<n, and k is a threshold that may be selected based on experimental results.

Additional details regarding the above-listed equations may be understood by one of skill in the art in light of Koh, Pang Wei, and Percy Liang, "Understanding black-box predictions via influence functions," arXiv preprint arXiv: 1703.04730 (2017), which is incorporated herein by reference in its entirety.

FIG. 3 illustrates an example computer system 300 that may be employed in verifying that influence of a user data point has been removed from the machine learning classifier. In some embodiments, the computer system 300 may be part of any of the systems or devices described in this disclosure. For example, the computer system 300 may be part of any of the network device 104 or the network device 106 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIG. 2. These computer-executable instructions may be included, for example, in the operating system 310, in one or more applications, such as the application 314, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIG. 2. In some embodiments, the application 314 may be part of the operating system 310 or may be part of an application of the computer system 300, or may be some combination thereof. In some embodiments, the application 314 may function as the security application 108 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for verifying that influence of a user data point has been removed from a machine learning classifier, at least a portion of the method being performed by a network device comprising one or more processors, the method comprising:

training, by a network device, a machine learning classifier using a training set of data points that includes a user data point;

calculating, by the network device, a first loss of the machine learning classifier;

updating, by the network device, the machine learning classifier by updating parameters of the machine learning classifier to remove influence of the user data point using an influence function without retraining the machine learning classifier;

calculating, by the network device, a second loss of the machine learning classifier;

calculating, by the network device using an influence function, an expected difference in loss of the machine learning classifier due to removal of the influence of the user data point from the machine learning classifier; and verifying that the influence of the user data point has been removed from the machine learning classifier by determining, by the network device, that the difference between the first loss and the second loss is within a threshold of the expected difference in loss.

2. The method of claim 1, wherein the machine learning classifier is one or more of a Logistic Regression (LR) classifier, a Linear Support Vector Machine (LSVM) classifier, and a Multi-Layer Perceptron (MLP) classifier.

3. The method of claim 1, wherein the user data point comprises personally identifiable information of an individual inside the European Union.

4. The method of claim 3, further comprising:
receiving, at the network device, a request pursuant to the European Union General Data Protection Regulation (GDPR) to remove the influence of the user data point from the machine learning classifier.

5. The method of claim 1, further comprising:
receiving, at the network device from a second network device, application programming interface (API) queries of a model inversion attack against the machine learning classifier; and
thwarting, at the network device, the model inversion attack against the machine learning classifier, due to the updated parameters of the machine learning classifier, to protect the user data point from being exposed by the model inversion attack.

6. The method of claim 5, wherein the machine learning classifier is exposed to the API as a Machine Learning as a Service (MLaaS) offering to enable API queries against the machine learning classifier.

7. The method of claim 1, further comprising:
sending, from the network device and to a second network device, verification that the influence of the user data point has been removed from the machine learning classifier.

8. One or more non-transitory computer-readable media comprising one or more computer-readable instructions that, when executed by one or more processors of a network device, cause the network device to perform a method for verifying that influence of a user data point has been removed from a machine learning classifier, the method comprising:
training, by a network device, a machine learning classifier using a training set of data points that includes a user data point;
calculating, by the network device, a first loss of the machine learning classifier;
updating, by the network device, the machine learning classifier by updating parameters of the machine learning classifier to remove influence of the user data point using an influence function without retraining the machine learning classifier;
calculating, by the network device, a second loss of the machine learning classifier;
calculating, by the network device using an influence function, an expected difference in loss of the machine learning classifier due to removal of the influence of the user data point from the machine learning classifier; and
verifying that the influence of the user data point has been removed from the machine learning classifier by determining, by the network device, that the difference between the first loss and the second loss is within a threshold of the expected difference in loss.

9. The one or more non-transitory computer-readable media of claim 8, wherein the machine learning classifier is one or more of a Logistic Regression (LR) classifier, a Linear Support Vector Machine (LSVM) classifier, and a Multi-Layer Perceptron (MLP) classifier.

10. The one or more non-transitory computer-readable media of claim 8, wherein the user data point comprises personally identifiable information of an individual inside the European Union.

11. The one or more non-transitory computer-readable media of claim 10, wherein the method further comprises:
receiving, at the network device, a request pursuant to the European Union General Data Protection Regulation (GDPR) to remove the influence of the user data point from the machine learning classifier.

12. The one or more non-transitory computer-readable media of claim 8, wherein the method further comprises:
receiving, at the network device from a second network device, application programming interface (API) queries of a model inversion attack against the machine learning classifier; and
thwarting, at the network device, the model inversion attack against the machine learning classifier, due to the updated parameters of the machine learning classifier, to protect the user data point from being exposed by the model inversion attack.

13. The one or more non-transitory computer-readable media of claim 12, wherein the machine learning classifier is exposed to the API as a Machine Learning as a Service (MLaaS) offering to enable API queries against the machine learning classifier.

14. The one or more non-transitory computer-readable media of claim 8, further comprising:
sending, from the network device and to a second network device, verification that the influence of the user data point has been removed from the machine learning classifier.

15. A network device comprising:
one or more processors; and
one or more non-transitory computer-readable media comprising one or more computer-readable instructions that, when executed by the one or more processors, cause the network device to perform a method for verifying that influence of a user data point has been removed from a machine learning classifier, the method comprising:
training, by a network device, a machine learning classifier using a training set of data points that includes a user data point;
calculating, by the network device, a first loss of the machine learning classifier;
updating, by the network device, the machine learning classifier by updating parameters of the machine learning classifier to remove influence of the user data point using an influence function without retraining the machine learning classifier;
calculating, by the network device, a second loss of the machine learning classifier;
calculating, by the network device using an influence function, an expected difference in loss of the machine learning classifier due to removal of the influence of the user data point from the machine learning classifier; and
verifying that the influence of the user data point has been removed from the machine learning classifier by determining, by the network device, that the difference between the first loss and the second loss is within a threshold of the expected difference in loss.

16. The network device of claim 15, wherein the machine learning classifier is one or more of a Logistic Regression (LR) classifier, a Linear Support Vector Machine (LSVM) classifier, and a Multi-Layer Perceptron (MLP) classifier.

17. The network device of claim 15, wherein:
the user data point comprises personally identifiable information of an individual inside the European Union; and
the method further comprises receiving, at the network device, a request pursuant to the European Union General Data Protection Regulation (GDPR) to remove the influence of the user data point from the machine learning classifier.

18. The network device of claim 15, wherein the method further comprises:
receiving, at the network device from a second network device, application programming interface (API) queries of a model inversion attack against the machine learning classifier; and
thwarting, at the network device, the model inversion attack against the machine learning classifier, due to the updated parameters of the machine learning classifier, to protect the user data point from being exposed by the model inversion attack.

19. The network device of claim 18, wherein the machine learning classifier is exposed to the API as a Machine Learning as a Service (MLaaS) offering to enable API queries against the machine learning classifier.

20. The network device of claim 15, further comprising:
sending, from the network device and to a second network device, verification that the influence of the user data point has been removed from the machine learning classifier.

\* \* \* \* \*